(12) United States Patent
Gottfried

(10) Patent No.: US 8,227,938 B2
(45) Date of Patent: Jul. 24, 2012

(54) BATTERYLESS STARTER FOR UPS WITH SENSOR, MOTOR GENERATOR, RECTIFIER, AND TRANSFORMER

(76) Inventor: Carlos Gottfried, México DF (MX)

( * ) Notice: Subject to any disclaimer, the term of this patent is extended or adjusted under 35 U.S.C. 154(b) by 158 days.

(21) Appl. No.: 11/989,981

(22) PCT Filed: Aug. 7, 2006

(86) PCT No.: PCT/US2006/030691
§ 371 (c)(1),
(2), (4) Date: Feb. 4, 2008

(87) PCT Pub. No.: WO2007/019430
PCT Pub. Date: Feb. 15, 2007

(65) Prior Publication Data
US 2009/0091190 A1    Apr. 9, 2009

(51) Int. Cl.
H02J 9/00 (2006.01)
H02J 1/16 (2006.01)
H02J 3/30 (2006.01)
H01F 1/00 (2006.01)
H01F 3/00 (2006.01)

(52) U.S. Cl. ............... 307/68; 307/64; 307/65; 307/66; 307/67

(58) Field of Classification Search ............ 307/68
See application file for complete search history.

(56) References Cited

U.S. PATENT DOCUMENTS

| | | | | | |
|---|---|---|---|---|---|
| 4,827,152 | A | * | 5/1989 | Farkas | 307/68 |
| 5,237,815 | A | * | 8/1993 | McArthur | 60/787 |
| 5,783,932 | A | * | 7/1998 | Namba et al. | 322/16 |
| 6,153,943 | A | * | 11/2000 | Mistr, Jr. | 290/52 |
| 6,191,500 | B1 | * | 2/2001 | Toy | 307/64 |
| 6,288,456 | B1 | * | 9/2001 | Cratty | 307/64 |
| 6,791,208 | B2 | * | 9/2004 | Pfeiffer | 307/64 |
| 2004/0155526 | A1 | * | 8/2004 | Naden et al. | 307/43 |
| 2005/0200205 | A1 | * | 9/2005 | Winn et al. | 307/64 |

* cited by examiner

Primary Examiner — Rexford Barnie
Assistant Examiner — Justen Fauth
(74) Attorney, Agent, or Firm — Egbert Law Offices PLLC

(57) ABSTRACT

Uninterruptible Power Supply system comprising motor generator means for conditioning electric power; backup generator means including an internal combustion engine having electrically driven starter, providing backup electric power; electrical switch means, said switch means being electrically connected to power mains and to the backup generator means' electrical output and the motor generator means' electrical input for selectively switching power from the electric means and the backup generator to the motor generator means; starter switch means electrically connected to the motor generator means' output and electrically connected to the input of the starter system of the backup generator means, for switchably connecting the motor generator means' electrical output to the starter system means' input.

1 Claim, 1 Drawing Sheet

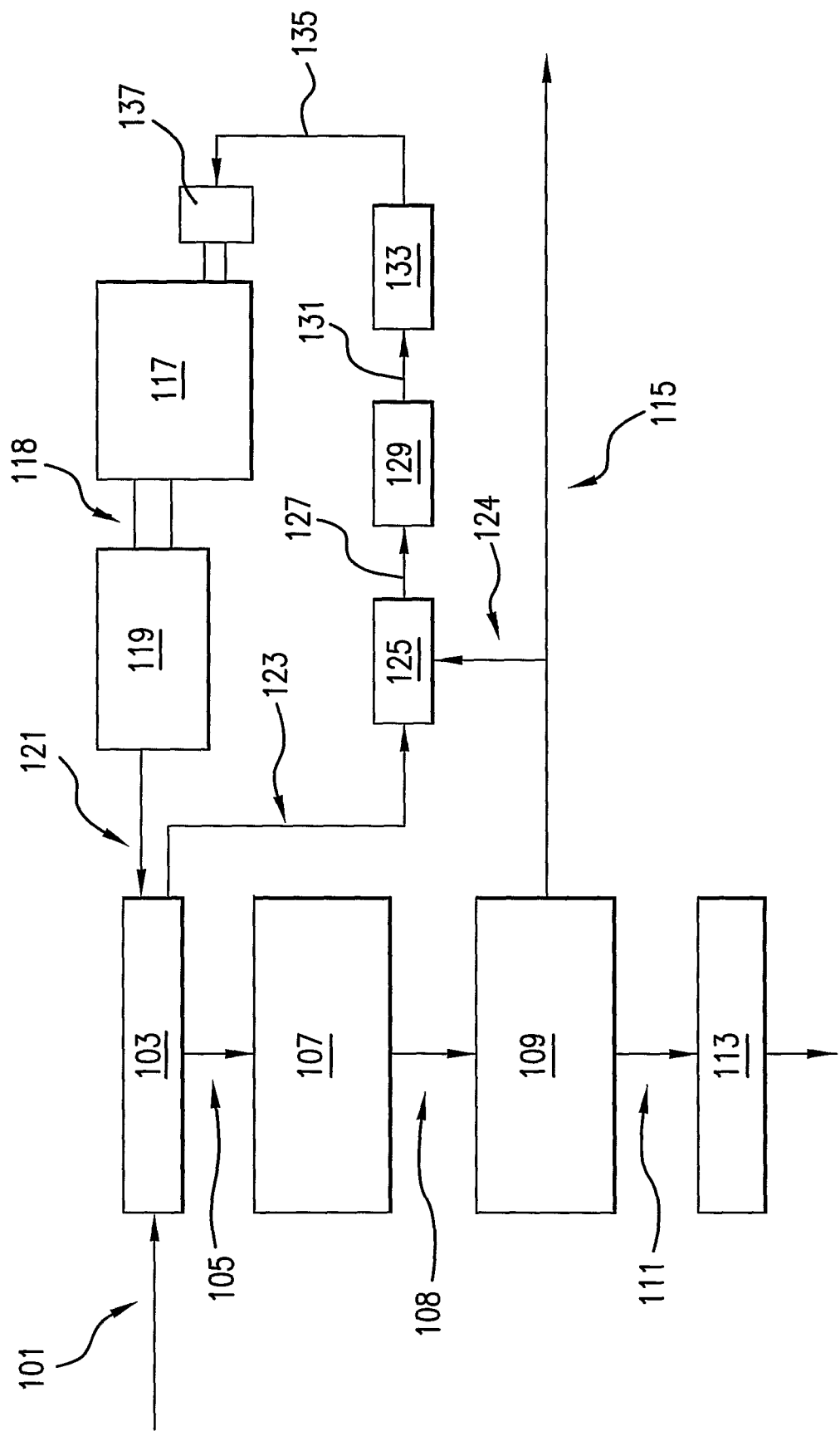

BATTERYLESS STARTER FOR UPS WITH SENSOR, MOTOR GENERATOR, RECTIFIER, AND TRANSFORMER

BACKGROUND OF THE INVENTION

1. Field of the Invention

The present invention relates generally to apparatus and method for supplying electric power to the starter motor of a UPS system when line power fails. More specifically, the present invention teaches an apparatus for using kinetic energy stored in the rotating elements of a UPS motor generator to supply the power required for the starter motor system of an internal combustion backup generator.

2. Description of the Related Art

The present application for a batteryless starter system may be more easily understood if it is read with the uninterruptable power supply systems taught by U.S. Pat. No. 4,460,834 issued Jul. 7, 1984 and UPS Cogeneration System, U.S. Pat. No. 4,686,375 issued Aug. 11, 1987.

Virtually all prior art UPS systems, which use an internal combustion engine to drive a standby generator, including those taught by U.S. Pat. Nos. 4,460,834 and 4,686,375, require the use of a chemical storage battery and related charging and control circuits. The present inventor, form his experience in building and installing numerous UPS systems, and believes that those skilled in the art have gone to great lengths to deal with the many problems caused by the use of a chemical storage battery to supply the brief burst of power required to run the starter motor of the internal combustion engine of a backup generator in a UPS system. Persons skilled in the art have used sealed chemical cells of expensive exotic materials such as lithium and silver rather than ordinary lead-acid storage batteries and have done much research to make these batteries more dependable, smaller, less expensive and less prone to degenerative failure. All chemical storage batteries used in UPS systems must be both charged and replaced. They must be charged on a regular schedule in order to maintain enough of a charge in the battery to dependably operate the starter motor of the backup generator. Some experts in this art teach that UPS batteries should be completely discharged and then recharged on a regular cycle as part of the ordinary maintenance of the UPS system, in order to maximize total battery life. These batteries must also be replaced from time to time to insure that the battery is fresh enough to be able to hold a charge between the routine charging cycles dictated by normal operation and maintenance of the UPS system.

The batteries that power the starter motor for standby electric generators need to be kept as small, light and inexpensive as possible for the sake of economy. This set of conditions, i.e. small and light, are design criteria that conflict directly with the battery's need to be of large capacity to dependably supply a large flow of current infrequently to actually operate backup generator starter system. Charging a chemical battery many times can cause warpage of the plates that form the cells of the battery. When a large load is placed across a battery, high temperatures and mechanical stresses are generated between these plates. If a battery is marginal due to repeated chargings cycles, or is near the end of its storage life, it can fail because of these thermal and mechanical stresses, rendering the UPS system inoperable. In order to avoid this problem, some UPS systems require redundant starter battery sets with automatic switchover means in case one battery set fails. The maintenance and replacement of these batteries is expensive. Malfunction of batteries and their associated charging equipment is a common reason for UPS system failure.

Additionally, some small UPS systems have had redundant backup recoil starters. If the battery driven starter motor fails to start the auxiliary generator, it may be cranked by hand or by a mechanical spring. This is only practical for very small generators. Large backup generators rely either on an expensive program of frequent battery replacement, or redundant chemical battery sets to insure that they will start reliably in an emergency.

SUMMARY OF THE PRESENT INVENTION

The present invention is a UPS system comprising a motor generator that can be driven either by ordinary line current or by current from an internal combustion backup generator, which has an electric starter motor; further comprising a means for switching a portion of the output of the motor generator on failure of the mains power through a transformer and rectifier whereby the kinetic energy of the motor generator provides the electric power required to operate the starting system of the standby internal combustion generator.

BRIEF SUMMARY OF THE DRAWING

FIG. 1 is a block diagram illustrating the preferred embodiment of the present invention.

DESCRIPTION OF THE PREFERRED EMBODIMENT

In FIG. 1, input power line 101 is the power input from the mains of the electric utility grid. Power line 101 is fed to one side of switch 103. The output of switch 103 is fed through power line 105 to motor 107. Motor 107 is connected by shaft 108 to generator 109. Generator 109 is further connected through shaft 111 to flywheel 113. Flywheel 113 is large enough to store rotating kinetic energy sufficient to operate the generator without unacceptable voltage or frequency change during the time required to start the backup generator and switch it on line. Output line 115 of generator 109 is the UPS uninterruptable output supply line. All of the above is described in more detail in U.S. Pat. Nos. 4,460,834 and 4,686,375.

In FIG. 1, further, internal combustion backup engine 117 has an associated electric starting motor system 137. Motor 117 drives backup generator 119 through shaft 118. When main power fails, the electrical output of backup generator 119 is fed through line 121 to switch 103. Switch 103 is configured electrically so that in the event of a failure of power to motor 107, a signal is sent through line 123 to starter switch 125. Starter switch 125 then feeds power from power line 115 through electric line 124 through line 127 to transformer 129, which is a step down transformer that changes the ac voltage generated by generator 109 to the voltage used by the starter motor 137. The ac power from transformer 129 flows through line 131 to rectifier assembly 133, which converts the ac power to do power usable by dc motor 137.

The starter motors on most commercially available internal combustion backup engines use 12 or 24 volt dc power. Clearly, starter motor 137 could be an ac electric motor. It could even be designed to run directly off the power from generator 109. The inventor believes, however, that commercial embodiments of the invention will use a step down transformer and rectifier to condition the power before it is delivered to the starter system.

Functionally, in normal operation electric power from line 101 runs motor 107 and generator 109, through switch 103 and line 105. Motor 107 drives generator 109 through shaft 108 and also drives flywheel 113 through shaft 111. Generator 109 generates power on line 115.

In the event of a power failure, line 101 goes low and switch 103 sends an electrical signal through line 123 closing switch 125. The closing of switch 125 within a few milliseconds of power failure, causes power to flow from generator 109 through lines 124 and 127 to transformer 129 where it is stepped down to the voltage used by motor 137. This stepped down ac power flows through line 131 to rectifier 133 where it is changed from ac to dc. The dc power is fed through line 135 to starter motor 137.

Starter motor 137 cranks internal combustion motor 117, which starts and drives generator 119 through shaft 118. The electrical output from generator 119 flows through line 121 into switch 103. The availability of power at switch 123 changes the electrical stat of line 123 and opens switch 125, which removes the flow of current to the starter motor. The flow of electric power from the backup generator flows through line 105 to motor 107, which drives generator 109, resulting in an uninterrupted supply of electric power output through line 115.

Flywheel 113 in the motor motor-generator set is sized to have sufficient kinetic energy to drive the external load and also to provide enough power through transformer 129 and rectifier 133 to drive starter motor 139 long enough to start generator 117 without an unacceptable loss in angular velocity. Within reasonable limits, the negative feedback circuits which are part of the ordinary art of voltage regulated generators can compensate for voltage drop caused by a decrease in rotational speed. There is a frequency change in the output ac power, but rivals of prototype apparatus constructed according to the present invention have confirmed that the starter system of the present invention works without introducing unacceptable ripple or voltage drop into the outgoing UPS power line.

Although the above specification and drawing teaches the preferred embodiment of the present invention. It is clear that the present invention can be used on any UPS system whose energy storage elements contain enough energy to provide power for the starter motor of a standby generator without causing a serious frequency shift or voltage drop in the output UPS power line. Thus the present invention should not be limited to the preferred embodiment shown above, but rather should only be limited by the appended claims and their reasonable equivalents.

I claim:

1. An uninterruptible power supply system comprising:
a motor generator means for conditioning electric power;
a backup generator means including an internal combustion engine having an electrically-driven starter, said electrically-driven starter operating at a voltage and an amperage provided by said motor generator means, said backup generator means for providing a backup supply of electric power;
an electrical switch means electrically connected to a power mains and to an electrical output of said backup generator means and to an electrical input of said motor generator means, said electrical switch means for selectively switching power from the power mains and said backup generator means to said motor generator means;
a starter switch means electrically connected to an output of the motor generator means and electrically connected to an input of said electrically driven starter of said backup generator means, said starter switch means for switchably connecting the output of said motor generator means to the input of said electrically-driven starter;
a sensor means responsive to an output of said electrical switch means and electrically connected to said starter switch means, said sensor means for closing said starter switch means when a flow of electric power to said motor generator means is interrupted; and
power conditioning means between and electrically connected to said starter switch means and said electrically-driven starter, said power conditioning means for conditioning the flow of electric power so said power delivered to said electrically-driven starter is at said voltage and said amperage.

* * * * *